United States Patent
Michel et al.

(10) Patent No.: US 7,044,428 B2
(45) Date of Patent: May 16, 2006

(54) MOUNTING SYSTEM COMPRISING A MOUNTING DEVICE

(75) Inventors: Hartmut Michel, Heidenheim (DE); Rainer Hebel, Heidenheim (DE); Siegfried Adler, deceased, late of Hermaringen (DE); by Eva Adler, legal representative, Königsbronn (DE); by Eva Rohde, legal representative, Königsbronn (DE); by Judith Adler, legal representative, Giengen (DE)

(73) Assignee: Epcos AG, Munich (DE)

( * ) Notice: Subject to any disclaimer, the term of this patent is extended or adjusted under 35 U.S.C. 154(b) by 49 days.

(21) Appl. No.: 10/257,015

(22) PCT Filed: Mar. 5, 2001

(86) PCT No.: PCT/DE01/00832

§ 371 (c)(1),
(2), (4) Date: Sep. 4, 2003

(87) PCT Pub. No.: WO01/77537

PCT Pub. Date: Oct. 18, 2001

(65) Prior Publication Data

US 2004/0094688 A1    May 20, 2004

(30) Foreign Application Priority Data

Apr. 5, 2000    (DE)    ............................. 100 16 864

(51) Int. Cl.
*F16M 9/00* (2006.01)

(52) U.S. Cl. .................. 248/680; 248/674; 248/638

(58) Field of Classification Search ............... 248/680, 248/638, 154, 674, 213.2, 223.41, 230.1, 248/230.8, 230.9, 310, 313, 315, 316.1; 361/529, 361/509, 517, 518, 519, 534–539
See application file for complete search history.

(56) References Cited

U.S. PATENT DOCUMENTS

| 519,312 | A | * | 5/1894 | Arthur | 24/282 |
| 643,298 | A | * | 2/1900 | Lampitt et al. | 24/458 |
| 2,319,761 | A | * | 5/1943 | Bruning et al. | 24/270 |
| 2,669,729 | A | * | 2/1954 | Stader | 384/27 |
| 3,239,175 | A | * | 3/1966 | Seibel | 248/154 |
| 6,259,595 | B1 | * | 7/2001 | Hebel et al. | 361/517 |
| 6,265,661 | B1 | * | 7/2001 | Schweikert et al. | 174/58 |

FOREIGN PATENT DOCUMENTS

| DE | 39 37 521 A1 | 5/1991 |
| DE | 4331377 A1 * | 3/1995 |
| DE | 296 17 888 | 6/1997 |
| DE | 197 21 287 | 7/1998 |
| DE | 39 37 521 C2 | 7/1999 |
| FR | 2 416 369 | 8/1979 |
| GB | 777733 | 6/1957 |
| WO | WO 9853468 A1 * | 11/1998 |
| WO | WO 9856051 A2 * | 12/1998 |

* cited by examiner

*Primary Examiner*—Ramon O Ramirez
(74) *Attorney, Agent, or Firm*—Schiff Hardin LLP

(57) ABSTRACT

A mounting arrangement for mounting a component on a mounting plate has an elastic ring whose inside comprises a circumferential surface structure. The ring has two axial holes for fastening the ring on the mounting plate, and the ring has a radial slot that separates the ring between two end sections, so that the ring can be spread apart and then clamped around a component. The mounting arrangement is useful for mounting cylindrical components such as electrolytic capacitors that comprise a bead in the region of the floor on a mounting plate.

8 Claims, 3 Drawing Sheets

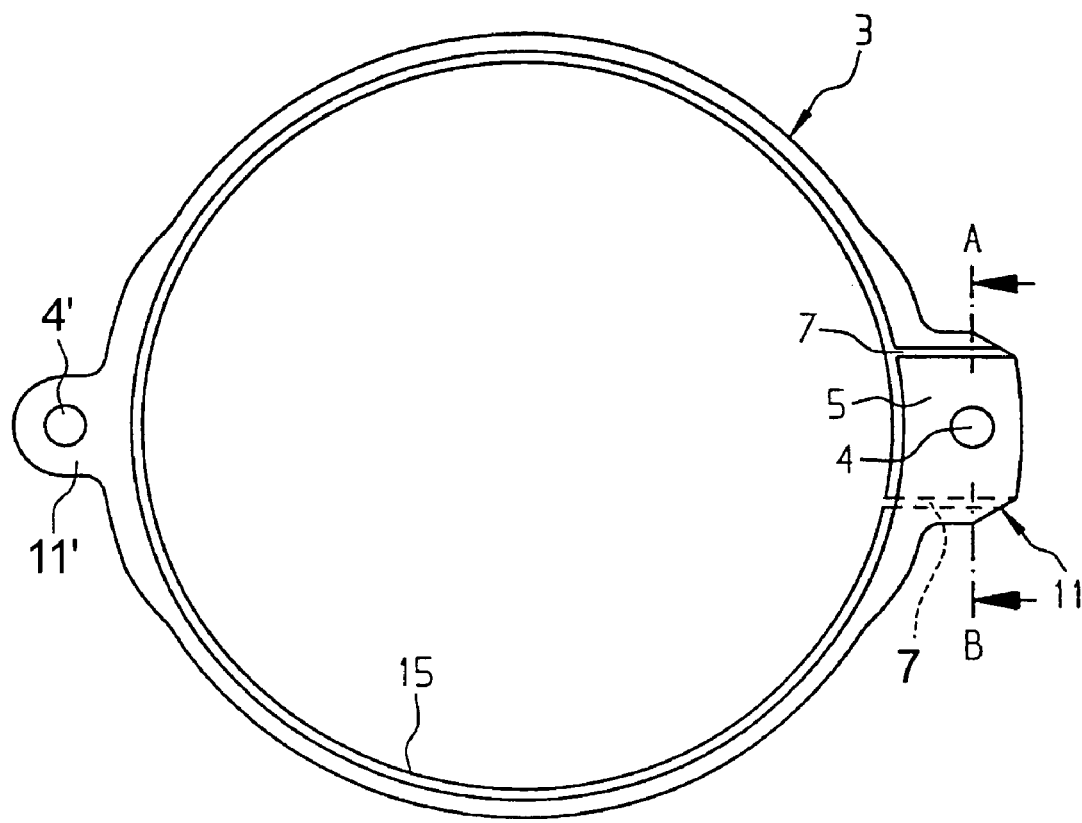
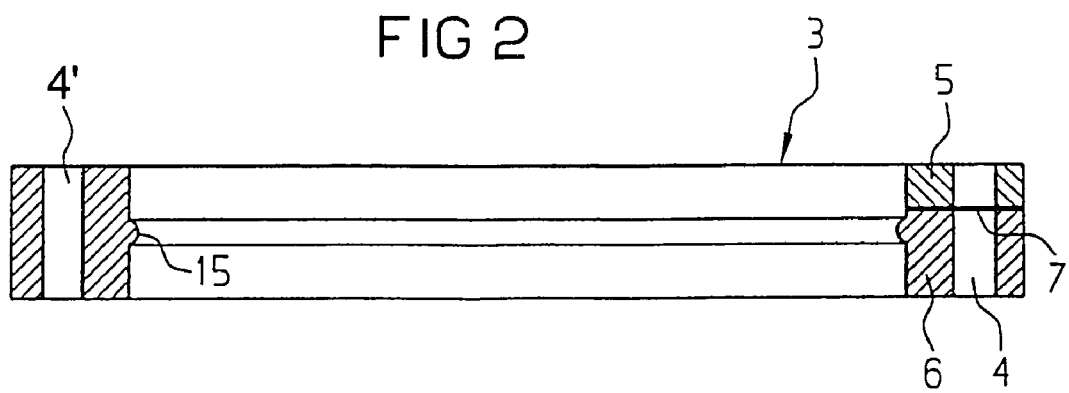

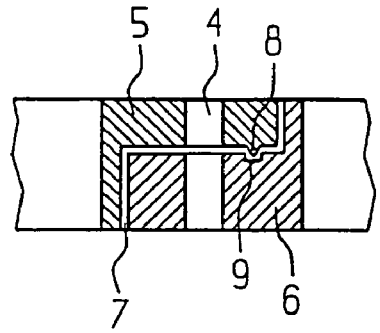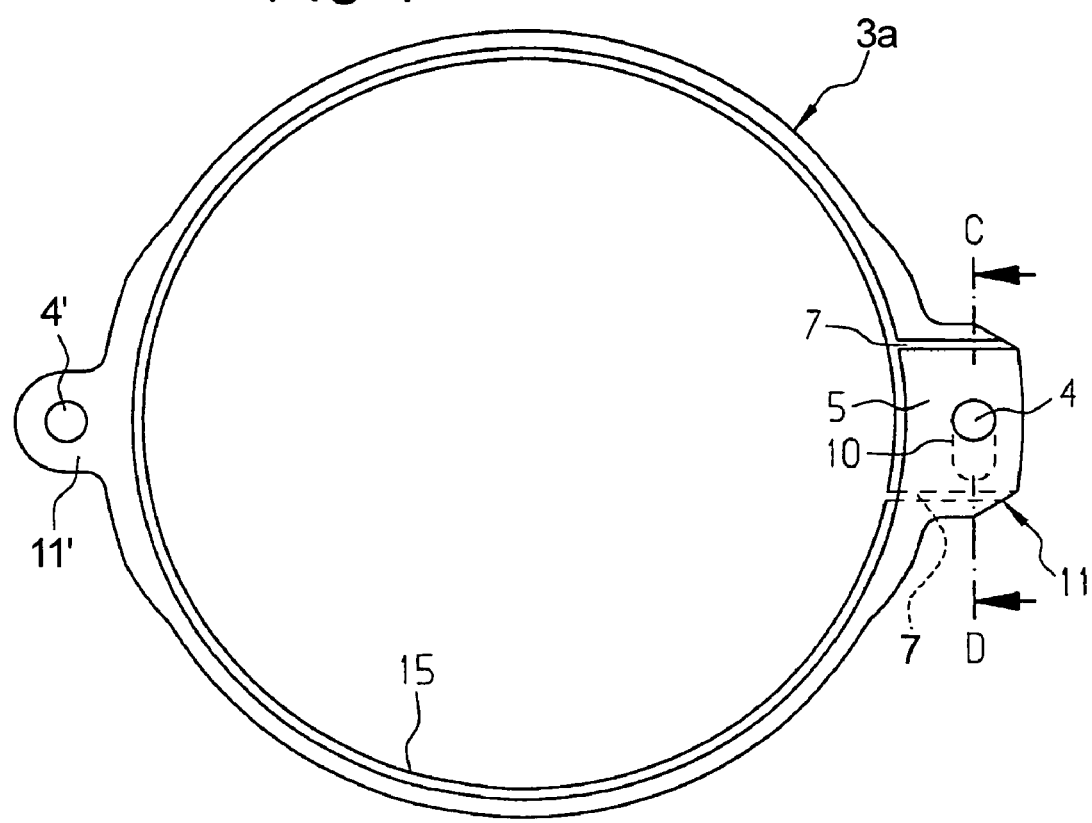

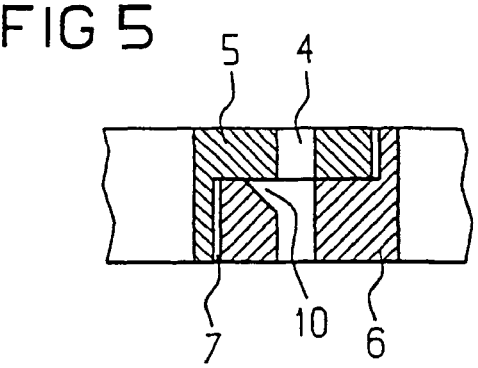
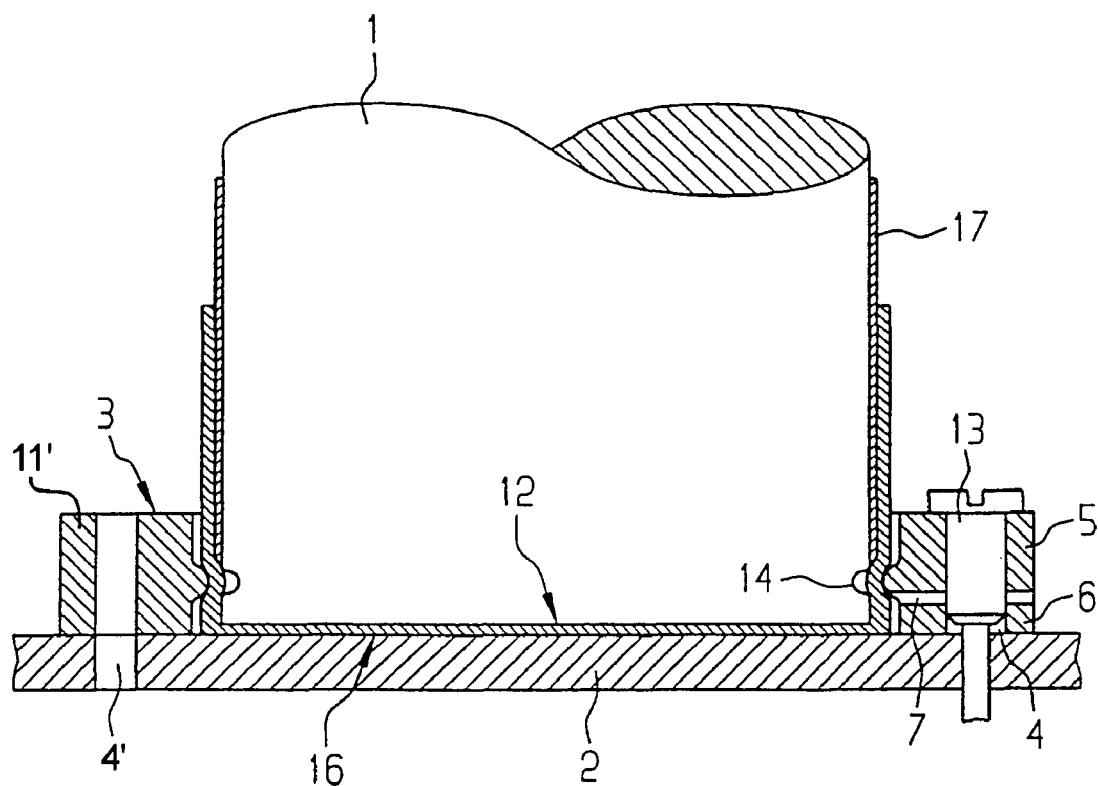

MOUNTING SYSTEM COMPRISING A MOUNTING DEVICE

BACKGROUND OF THE INVENTION

The invention is directed to a mounting device for mounting a component on a mounting plate. The invention is also directed to a mounting arrangement comprising the mounting device. Over and above this, the invention is directed to the employment of the mounting device.

DE 197 21 287 C1 discloses mounting means for mounting a component, particularly an electrolytic capacitor, on a mounting plate. The mounting means are clamping elements that can be screwed to a heat elimination plate. The clamping elements lie against the walls of the housing of the electrolytic capacitor and have points at their end face facing toward the housing walls. In the clamp region of the clamping elements, the housing has an indentation serving as mounting aid, whereby the center line of the indentation is arranged higher than the position achieved after the fastening of the housing by means of the points of the clamping elements.

This known mounting means has the disadvantage that at least four clamping elements are required for the secure fastening of the electrical component. A very large space requirement on the mounting plate results therefrom. Over and above this, the manipulation of the individual clamping elements, which are individually screwed onto the mounting plate, is very complicated.

SUMMARY OF THE INVENTION

It is therefore a goal of the present invention to offer a mounting means or device for mounting a component on a mounting plate that uses a small space on the mounting plate and that can be quickly and simply secured.

This goal is inventively achieved by a mounting means or device for mounting a component on a mounting plate, which device includes an elastic ring having an inside with a circumferential surface structure. The ring has two axial holes for fastening the ring with a flat side or surface on the mounting plate. The ring has a radially proceeding slot that separates the ring between two end sections, and the device includes means for clamping the ring around the component.

The inventive device or means for embracing the component with the ring sees to a dependable fastening of the component on the mounting plate. Since the ring embraces the entire circumference of the component, only two holes with the corresponding, required fastening means are needed for fastening the ring on the mounting plate. The component with the inventive mounting means can therefore be secured on the mounting plate in an especially simple and space-saving way.

In addition, a mounting means is especially advantageous wherein the surface structure is a salient bead. Such a surface structure is especially easy to produce and can, for example, be used for engaging into a corresponding groove of the component according to the tongue and groove principle.

The ring can be clamped around the component especially well when the inside of the ring lies on a cylinder surface given a correspondingly round outside surface of the component. Such a mounting means can be especially advantageously employed for mounting cylindrical components such as, for examples electrolytic capacitors.

In addition, a mounting means is especially advantageous wherein the end sections of the ring are shaped so that they interlock when the ring is pressed together. As a result of this specific fashioning of the ring, a component can be easily positioned and secured after the ring has been slipped over the component and the end sections have engaged.

In addition, an embodiment of the mounting means is especially advantageous wherein the slot is shaped such that the end sections overlap one another, and with one of the holes extending through the two end sections. A mounting means designed in this way can, for example, be clamped around the component during the fastening on the mounting plate. A screw with a conical end can advantageously serve this purpose and is screwed through the hole passing through both end sections, so that the narrow end of the conical screw engages through the not exactly aligned holes of the two end sections when the screw is inserted through the end sections, and so that the cone migrates in the direction of the mounting plate when the screw is screwed tight and thus pulls the two end sections closer and closer together.

An embodiment of the mounting means is also especially advantageous wherein an end section comprises a catch hook that engages into a corresponding recess of the other end section. As a result thereof, a latching of the two end sections in one another can be easily realized.

In addition, a mounting means is especially advantageous wherein the hole in one of the end sections is conically expanded at the slot side in the direction toward the other end section. Such a mounting means has the advantage that, for example, a screw that secures the mounting means on the mounting plate can be especially easily introduced into the corresponding hole passing through the two end sections. In a certain sense, the conical expansion thereby serves as an introduction aid for the screw. After the screw has been completely plugged through the hole, the ring is also automatically clamped around the component. The clamping of the ring with an ordinary, straight screw is thus possible.

In addition, it is also possible to design the mounting means so that the hole is expanded to an oblong hole at only one side, whereby the oblong hole is directed toward the slot.

The mounting means can be especially advantageously fabricated of a mixture of plastic and fiberglass or of a mixture of plastic and mineral fibers. For example, polyamides having a mineral fiber content of 25% come into consideration as the mineral fiber/plastic mixture. However, it is also possible to employ polybutyleneteraphthalate with a 20% content of mineral fibers as the mineral fiber/plastic mixture. These mineral fiber/plastic mixtures can be especially easily and inexpensively manufactured and worked. The glass part or, respectively, mineral part in the fiber/plastic mixture thereby sees to the required strength of the mounting means. However, it is also conceivable to manufacture the mounting means of, for example, brass or spring steel sheet.

In addition, a mounting means is especially advantageous wherein a respective hole is located in two continuations that lie opposite one another and are arranged on the outside of the ring. As a result thereof, it is possible to provide a minimal width for the ring. Moreover, the continuations define a broad side and a narrow side, and this makes it possible to accommodate a plurality of mounting means on the mounting plate in an especially space-saving fashion with their narrow sides next to one another.

In addition, the invention specifies a mounting arrangement wherein a component is mounted on a mounting plate by means of an inventive mounting means or device. The component comprises a planar floor, and the outside of the component comprises a circumferential surface structure latched to the inside of the ring. The ring is clamped around the component and is secured on the mounting plate by means of its holes. The fastening of the ring on the mounting plate ensues such by means of fastening devices projecting through the hole that the floor of the component is pressed onto the mounting plate.

The inventive mounting arrangement has the advantage that it produces a direct contact between the floor of the component and the mounting plate in a simple way. When the mounting plate is composed of thermally conductive material, the mounting plate can therefore be employed as a heat elimination for the heat generated in the component during operation.

In addition, a mounting arrangement is especially advantageous wherein the surface structure of the component has a groove and wherein the surface structure of the ring has a tongue that mates with the groove. The surface structure of the component in the form of a groove can be especially easily realized in that, for example, it is pressed into a sheet metal housing.

In addition, a mounting arrangement is especially advantageous wherein the component has the shape of a cylinder. Such a component can be especially advantageously mounted with a ring whose inside lies on a cylinder surface. For example, electrolytic capacitors, which usually have the shape of a cylinder, can thus be secured on the mounting plate in a simple way. In addition, the ring can be especially easily and cleanly clamped around a round component since the clamping forces need not be conducted around corners.

In addition, a mounting arrangement is especially advantageous wherein the ring is clamped around the component by latching its end sections. Such a mounting arrangement has the advantage that the ring clamped around the component produces a unit that is easy to mount and that can simply be screwed fast on the mounting plate through straight holes. Over and above this, the procedure of clamping is separated from the procedure of fastening.

A mounting arrangement is also especially advantageous wherein the ring is clamped by a screw that is conducted through the expanded hole in the end section and is screwed into the mounting plate. Given such a mounting arrangement, the clamping of the ring has occurred during the screwing.

In addition, a mounting arrangement is especially advantageous wherein the ring is clamped by a screw that is conducted through a straight hole and screwed into the mounting plate. In the region of the end section at the side of the mounting plate, the screw thereby comprises a taper in the direction onto the mounting plate. With the assistance of this taper, the screw is especially easy to introduce through the hole leading through the end sections that may be shifted relative to one another. Over and above this, the ring is clamped around the component when the screw provided with the taper is screwed into the plate.

In addition, a mounting arrangement is especially advantageous wherein the contact surface between component and the ring is covered with a thin, elastic layer. Such a thin, elastic layer is usually applied on the component for electrical insulation. For example, a groove arranged on the surface of the component is covered by this layer. Such a component can be especially advantageously mounted on a mounting plate with the inventive ring since the ring allows the clamping forces that occur to press the elastic layer into the groove, so that a locking of the ring to the component combined with a firm hold of the component on the mounting plate is assured.

In addition, a mounting arrangement is especially advantageous wherein additional rings carrying components are secured on the mounting plate at one of the sides of the ring that are free of continuations. Such a mounting arrangement has the advantage that the space-saving design of the ring takes even greater effect due to the provision of a plurality of rings next to one another than when a single component is mounted on a mounting plate.

The invention also specifies an employment of the inventive mounting means for mounting cylindrical components on a mounting plate, whereby the components comprise a circumferential groove in the proximity of a planar limiting surface, said groove being covered by a thin, elastic layer. The inventive mounting means can be especially advantageously employed given such components since it allows the elastic layer to be pressed into the groove and thus sees to a secure fastening of the component on a mounting plate.

The invention is explained in greater detail below on the basis of exemplary embodiments and the appertaining Figures.

SUMMARY OF THE INVENTION

FIG. 1 shows an inventive mounting means in plan view;

FIG. 2 is a cross-sectional view of the inventive mounting means of FIG. 1;

FIG. 3 is a cross-sectional view taken along the line AB of FIG. 1;

FIG. 4 shows an embodiment of the mounting means in plan view;

FIG. 5 is a cross-sectional view taken along the line CD of FIG. 4; and

FIG. 6 is a schematic cross-sectional view of the inventive mounting arrangement.

DESCRIPTION OF THE PREFERRED EMBODIMENT

FIG. 1 shows an inventive mounting means that is a circular, elastic ring 3. Axial holes 4, 4' are provided at continuations 11, 11' of the ring 3. An inwardly salient bead 15 in the form of a spring is provided at the inside of the ring 3. The ring 3 comprises a slot 7 that parts the ring 3 between two end sections, whereby the two end sections overlap; only the first or top end section 5 can be seen in FIG. 1 for this reason.

FIG. 2 shows the ring 3 from FIG. 1 with the two holes, the salient bead 15 in the form of a spring as well as the first or top end section 5 and the second or lower end section 6 that are separated from one another by the slot 7.

FIG. 3 shows the two end sections 5, 6 that are separated from one another by the slot 7 and overlap one another. A hole 4 that serves for fastening the ring on a mounting plate is conducted through the two end sections 5, 6. The first end section 5 is provided with a catch hook 8 that engages into a corresponding recess 9 of the second end section 6.

FIG. 4 shows an inventive mounting means in the form of a circular, elastic ring 3a in plan view. Holes 4, 4' that serve for fastening the ring 3 on a mounting plate are arranged at continuations 11, 11' of the ring 3a. A salient bead 15 in the form of a spring is applied at the inside of the ring 3a. The ring 3a is parted by means of a slot 7 between two end sections. The two end sections overlap one another, for which reason only the first end section 5 can be seen in FIG. 4. The hole 4 that leads through both end sections is implemented as an oblong hole 10 in the upper region in the second or lower end section lying under the end section 5;

and this can be seen as a broken line in FIG. 4. Even with a slightly spread condition of the ring 3a, a screw can extend through the hole 4 in the end section 5 and can engage into the oblong hole 10 of the second end section 6. Since the oblong hole 10 is conically fashioned and ultimately ends in the hole 4 within the second end section 6, the ring 3a can be clamped by means of the oblong hole 10 by introducing an ordinary screw.

FIG. 5 shows the two end sections 5, 6 that are parted from one another by a slot 7. The hole 4 leads through both end sections 5, 6. The hole 4 is implemented as the oblong hole 10 that tapers conically downward in the upper region of the second end section 6.

FIG. 6 shows an inventive mounting arrangement with a cylindrical component 1 that has its floor 12 lying on a mounting plate 2. The component can, for example, be an electrolytic capacitor that comprises an aluminum pot as an outer housing. A circumferential groove 14, that facilitates the fastening of the electrolytic capacitor on the mounting plate 2, is impressed into the aluminum pot in the region of the floor 12. In addition, the electrolytic capacitor is covered with a shrink hose 17 at its curved outside wall. This shrink hose 17 typically has a thickness of 0.2 mm and is composed either of polyvinyl chloride or of polyester. It serves for an electrical insulation from other electrolytic capacitors that can likewise be arranged on the mounting plate 2. The electrical insulation in the region of the floor 12 of the electrolytic capacitor is accomplished with a cap that is implemented as an elastic layer or cup 16. The cap typically has a thickness of 0.2 mm and is preferably composed either of polycarbonate or of polybutylene terephthalate (PBT). The electrolytic capacitor typically has a diameter of 90 mm. The groove pressed into the outside wall of the electrolytic capacitor usually has a depth of 2 mm. The ring 3 embraces the component 1, whereby the bead 15 arranged at the inside of the ring 3 engages into the groove 14 of the component 1. As a result thereof, the elastic layer 16 is deformed, for which reason a minimal clamping force is required for the ring 3. The salient bead 15 at the inside of the ring 3 typically has a height of 1 mm. In an especially advantageous embodiment, the distance between groove 14 and floor 12 is selected so that the component 1 but not the ring 3 touches the mounting plate when the component 1 is put in place onto the mounting plate 2. What is thus achieved is that, after the ring 3 has been screwed fast, an additional force presses the component 1 onto the mounting plate 2, as a result whereof, in particular, the vibration resistance of the mounting arrangement is improved. The ring 3 is secured on the mounting plate 2 by means of two holes 4 and 4' arranged at its two sides. This fastening can, for example, ensue with a screw 13. Since the ring 3 is parted by means of the slot 7 between the two end sections 5, 6, and the hole 4 extends through both end sections 5, 6, the ring 3 can be clamped by means of a screw 13 that conically tapers at its lower end. The conical taper simultaneously sees to a centering, as a result whereof the screwing of the screw 13 is facilitated. The mounting plate 2 can be preferably fabricated of metal, for example aluminum or brass, because it is then simultaneously suited as heat elimination plate for the heat generated in the component 1 during operation. At its widest location, i.e. at the location where the continuations 11 and 11' are arranged, the ring has a width of 10 through 15 mm.

The invention is not limited to the embodiments shown by way of example but is defined in its most general form in the claims.

The invention claimed is:

1. A mounting device for mounting an electrical component on a mounting plate, comprising:
   an elastic ring having an inside surface with a circumferential surface structure, two axial holes for fastening the ring on the mounting plate, the ring being cut though by a radial slot to form two end sections, wherein
   the end sections can be spread apart to allow the ring to be placed around the electrical component and then released to clamp the electrical component, and wherein
   the slot is shaped so that the end sections of the ring overlap one another, one of the holes extends through the two end sections, and one end section of the ring has a latch hook that engages into a corresponding recess of the other end section of the ring.

2. A mounting device according to claim 1, wherein the surface structure is a salient bead.

3. A mounting device according to claim 1, wherein the inside surface lies on a cylinder surface.

4. A mounting device according to claim 1, wherein the end sections of the ring are shaped so that they interlock when the ring is pressed together.

5. A mounting device according to claim 1, wherein the hole in one of the end sections of the ring is conically expanded adjacent the slot and in the direction toward the other end section of the ring.

6. A mounting device according to claim 5, wherein the hole is expanded at only one side to form an oblong hole directed toward the slot.

7. A mounting device according to claim 1, wherein a respective hole is located in two continuations that lie opposite one another and are arranged at an outside surface of the ring.

8. A mounting device according to claim 1, wherein the ring is composed of a mineral fiber/plastic mixture.

* * * * *